(12) United States Patent
Matsumoto et al.

(10) Patent No.: US 12,545,797 B2
(45) Date of Patent: Feb. 10, 2026

(54) INKJET INKS FOR METALLIC PRINTED IMAGES

(71) Applicant: KAO CORPORATION, Tokyo (JP)

(72) Inventors: Yuta Matsumoto, Cincinnati, OH (US); Eric Miller, Cincinnati, OH (US)

(73) Assignee: KAO CORPORATION, Tokyo (JP)

( * ) Notice: Subject to any disclaimer, the term of this patent is extended or adjusted under 35 U.S.C. 154(b) by 36 days.

(21) Appl. No.: 18/703,382

(22) PCT Filed: Jan. 13, 2022

(86) PCT No.: PCT/US2022/012321
§ 371 (c)(1),
(2) Date: Apr. 22, 2024

(87) PCT Pub. No.: WO2023/136828
PCT Pub. Date: Jul. 20, 2023

(65) Prior Publication Data
US 2025/0236750 A1    Jul. 24, 2025

(51) Int. Cl.
*C09D 11/36* (2014.01)
*B41M 5/00* (2006.01)
*B41M 7/00* (2006.01)
*C09D 11/322* (2014.01)

(52) U.S. Cl.
CPC .......... *C09D 11/36* (2013.01); *B41M 5/0047* (2013.01); *B41M 7/009* (2013.01); *C09D 11/322* (2013.01)

(58) Field of Classification Search
CPC .................................................. C09D 11/322
See application file for complete search history.

(56) References Cited

U.S. PATENT DOCUMENTS

| | | | |
|---|---|---|---|
| 8,616,694 B2 | 12/2013 | Kagata et al. | |
| 2012/0249667 A1* | 10/2012 | Hirata | C09D 11/322 347/105 |
| 2013/0249996 A1 | 9/2013 | Saito et al. | |
| 2019/0276692 A1 | 9/2019 | Furukawa et al. | |
| 2020/0362186 A1* | 11/2020 | Cortes Salazar | C09D 11/54 |

FOREIGN PATENT DOCUMENTS

| | | |
|---|---|---|
| JP | 2012-1581 A | 1/2012 |
| JP | 2021-38338 A | 3/2021 |

OTHER PUBLICATIONS

International Search Report & Written Opinion issued Mar. 30, 2022 in PCT/US2022/012321, filed on Jan. 13, 2022, 7 pages.

(Continued)

*Primary Examiner* — Ian A Rummel
(74) *Attorney, Agent, or Firm* — Oblon, McClelland, Maier & Neustadt, L.L.P.

(57) ABSTRACT

An inkjet ink that includes (A) metal nanoparticles (e.g., silver nanoparticles); (B) trimethylene glycol; and (C) 1,2-hexanediol; the inkjet ink being characterized by extended decap times, long running stability, quick drying properties, and the ability to form metallic printed images with high metallic luster (high gloss). Also provided are a printed article which includes a metallic film formed from the inkjet ink disposed on a substrate, and a method of forming a metallic printed image, whereby the inkjet ink is applied via a thermal inkjet printhead and is subsequently dried, such as with a near infrared heater.

19 Claims, 1 Drawing Sheet

(56) References Cited

OTHER PUBLICATIONS

PubChem CID 10442, Sep. 16, 2004 (16.09.2004), [Retrieved on Mar. 11, 2022] Retrieved from internet: <URL:https://pubchem.ncbi.nlm.nih.gov/compound/1_3-Propanediol>, entire document, especially p. 1, synonyms, 5 pages.
Gu et al. "Fast near infrared sintering of silver nanoparticle ink and applications for flexible hybrid circuits", RSC Advances, vol. 8, pp. 30215-30222, Aug. 28, 2018 (Aug. 28, 2018).

* cited by examiner

INKJET INKS FOR METALLIC PRINTED IMAGES

BACKGROUND OF THE INVENTION

Field of the Invention

The present invention relates to inkjet inks, specifically inkjet inks that include (A) metal nanoparticles such as silver nanoparticles, (B) trimethylene glycol, and (C) 1,2-hexanediol.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal inkjet (TIJ) printing is a desirable technology for printing, coding, and marking as it offers high print resolutions at lower costs than competing technologies in the field, such as continuous inkjet methods. In thermal inkjet printing processes, the print cartridges contain a series of tiny chambers, each containing a heater, which produce ink droplets from thermal vaporization of an ink solvent. In the jetting process, a resistor is heated rapidly to produce a vapor bubble (hence the phrase "bubble jet"), which subsequently ejects a droplet from the orifice. This process is extremely efficient and reproducible and modern TIJ printheads for industrial graphics applications are capable of generating uniform drops of 4 pL or smaller in volume at frequencies of 36 kHz or greater.

For certain applications, metallic images with high metallic luster (i.e., "glossy"—possessing a mirror-like appearance or light-reflective qualities) are desired. However, providing such metallic images using inkjet ink printing technology poses a significant challenge. Traditionally, metallic pigmented inks have been used to provide metallic images. The metallic pigments used in these inks are typically of large particle size, for example on the order of about 100 nm or larger, and are applied in high density to achieve adequate legibility. As a result, metallic pigmented inks are prone to settling, leading to poor shelf-life, clogging of the inkjet nozzles, and defective jetting. Metallic pigmented inkjet inks thus typically require inkjet printers fitted with a mechanical mechanism (e.g., shaking or stirring mechanisms) for keeping the pigment suspended throughout the printing operation.

The use of dispersants to aid in the suspension of the metallic pigments and storage stability of the metallic pigmented inks is described in JP 2021-038338 and US 2019/0276692—each incorporated herein by reference in its entirety. However, there is a tradeoff between the amount of dispersant used and the glossiness of the metallic image, with increasing loadings of dispersant leading to a deterioration of the metallic luster (i.e., a finish which is "not glossy"—is hazy, dull, or non-reflective).

Further, the open atmosphere print head design (the nozzle orifices are open to atmosphere and there is no valve seal at the orifice to allow ink pressurization) of thermal inkjet printheads further exacerbates the issue of nozzle clogging, where decap time (print idle time) causes premature drying of ink in and around the nozzles. Solvent losses due to prolonged exposure to air within an uncapped printhead results in clogging/plugging of printhead nozzles and unreliable ink jetting and image quality erosion over time.

To improve decap performance, special solvent systems with high boiling components may be used to prevent such premature solvent losses in an uncapped printhead setting. However, these special solvent systems require extended drying times once the inks are applied, and thus inefficient overall printing processes. Therefore, it is often difficult to counterbalance the need for long decap times (the need for a slow rate of solvent loss) and short drying times (the need for a fast rate of solvent loss).

SUMMARY OF THE INVENTION

In view of the forgoing, there exists a need for inkjet inks that can provide metallic images of high metallic luster (glossy), have robust running stability during printing operations (i.e., are not prone to settling) without the need for special mechanical mechanisms for achieving adequate particle suspension, perform under extended decap conditions, but yet can be efficiently dried.

Accordingly, it is one object of the present invention to provide novel inkjet inks that meet these criteria.

It is another object of the present disclosure to provide novel printed articles which contain a metallic film, formed from the inkjet inks, disposed on a substrate.

It is another object of the present disclosure to provide novel methods of forming a metallic printed image on a substrate by applying the inkjet inks onto the substrate and drying the inkjet ink, thereby converting the inkjet ink into a metallic film forming the metallic printed image.

These and other objects, which will become apparent during the following detailed description, have been achieved by the inventors' discovery that silver nanoparticles can be stably suspended in an inkjet ink containing both trimethylene glycol and 1,2-hexanediol, such inks providing reliable ink jetting at extended decap times, and after being applied to a substrate surface, drying of the inkjet ink and coalescence of the silver nanoparticles provides high gloss metallic prints.

Thus, the present invention provides:

(1) An inkjet ink, comprising:
(A) metal nanoparticles;
(B) trimethylene glycol; and
(C) 1,2-hexanediol.
(2) The inkjet ink of (1), wherein the metal nanoparticles (A) are present in an amount of 1 to 25 wt. %, based on a total weight of the inkjet ink.
(3) The inkjet ink of (1) or (2), wherein the metal nanoparticles (A) have an average particle size of less than 100 nm.
(4) The inkjet ink of any one of (1) to (3), wherein the metal nanoparticles (A) are silver nanoparticles.
(5) The inkjet ink of any one of (1) to (4), wherein the trimethylene glycol (B) is present in an amount of 0.5 to 30 wt. %, based on a total weight of the inkjet ink.
(6) The inkjet ink of any one of (1) to (5), wherein the 1,2-hexanediol (C) is present in an amount of 0.1 to 15 wt. %, based on a total weight of the inkjet ink.
(7) The inkjet ink of any one of (1) to (6), wherein a weight ratio of trimethylene glycol (B) to 1,2-hexanediol (C), (B):(C), is from 0.1:1 to 20:1.
(8) The inkjet ink of any one of (1) to (7), further comprising (D) water.
(9) The inkjet ink of (8), wherein the water (D) is present in an amount of 15 to 60 wt. %, based on a total weight of the inkjet ink.

(10) The inkjet ink of (8) or (9), wherein a weight ratio of water (D) to a sum of trimethylene glycol (B) and 1,2-hexanediol (C), (D):((B)+(C)), is from 0.5:1 to 15:1.
(11) The inkjet ink of any one of (1) to (10), further comprising (E) a glycol co-solvent.
(12) The inkjet ink of (11), wherein the glycol co-solvent (E) is present in an amount of 1 to 40 wt. %, based on a total weight of the inkjet ink.
(13) The inkjet ink of (11) or (12), wherein the glycol co-solvent (E) is ethylene glycol, propylene glycol, or both.
(14) The inkjet ink of any one of (1) to (13), further comprising (F) an alkanolamine.
(15) The inkjet ink of (14), wherein the alkanolamine (F) is present in an amount of 0.1 to 10 wt. %, based on a total weight of the inkjet ink.
(16) The inkjet ink of (14) or (15), wherein the alkanolamine (F) is at least one selected from the group consisting of ethanolamine, propanolamine, isopropanolamine, diethanolamine, and triethanolamine.
(17) A printed article, comprising:
a substrate; and
a metallic film, formed from the inkjet ink of any one of (1) to (16), disposed on a surface of the substrate.
(18) A method of forming a metallic printed image on a substrate, comprising:
applying the inkjet ink of any one of (1) to (16) onto the substrate with a thermal inkjet printhead; and
drying the inkjet ink, thereby converting the inkjet ink into a metallic film forming the metallic printed image.
(19) The method of (18), wherein the inkjet ink is dried with a near infrared heater to sinter the metal nanoparticles (A), thereby converting the inkjet ink into the metallic film.

BRIEF DESCRIPTION OF THE DRAWINGS

The foregoing paragraphs have been provided by way of general introduction, and are not intended to limit the scope of the following claims. The described embodiments, together with further advantages, will be best understood by reference to the following detailed description when considered in conjunction with the accompanying drawings, wherein:

DETAILED DESCRIPTION OF THE INVENTION

In the following description, it is understood that other embodiments may be utilized and structural and operational changes may be made without departure from the scope of the present embodiments disclosed herein.

Definitions

The phrase "substantially free", unless otherwise specified, describes an amount of a particular component in the inkjet ink being less than 1 wt. %, preferably less than 0.5 wt. 00 more preferably less than 0.1 wt. %, even more preferably less than 0.05 wt. %, yet even more preferably 0 wt. %, relative to a total weight of the inkjet ink.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having at least 1, preferably at least 2, preferably at least 3, preferably at least 4 carbon atoms and up to 22, preferably up to 20, preferably up to 18, preferably up to 12, preferably up to 8 carbon atoms. Examples of alkyl groups include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl). Cycloalkyl is a type of cyclized alkyl group. Exemplary cycloalkyl groups include, but are not limited to, cyclopropyl, cyclobutyl, cyclopentyl, cyclohexyl, norbornyl, and adamantyl.

As used herein, the term "fatty" describes a compound with a long-chain (linear) hydrophobic portion made up of hydrogen and anywhere from 8 to 22 carbon atoms, which may be fully saturated or partially unsaturated.

As used herein, the term "aryl" refers to an aromatic group containing only carbon in the aromatic ring(s), such as phenyl, biphenyl, naphthyl, anthracenyl, and the like.

The term "arylalkyl", as used herein, refers to a straight, branched, or cyclic alkyl moiety (as defined above) that is substituted by an aryl group (as defined above) which may itself be optionally substituted by an alkyl group, examples of which include, but are not limited to, benzyl, phenethyl, 3-phenylpropyl, 2-phenylpropyl, 1-phenylpropyl, 4-phenylbutyl, 3-phenylbutyl, 2-phenylbutyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "(meth)acrylate" is used herein to refer to both acrylate and methacrylate groups. In other words, this term should be read as through "meth" is optional. Further, the term "(meth)acrylate" is used generally to refer to both (meth)acrylic acid-based compounds and (meth)acrylic ester-based compounds. Similarly, the term "(meth)acrylamide" is used herein to refer to both acrylamide and methacrylamide groups.

The term "decap behavior" refers to the ability of the inkjet ink to readily eject from the printhead, upon prolonged exposure to air. The inkjet ink "decap time" is measured as the amount of time that an inkjet printhead may be left uncapped before the printer nozzles no longer fire properly, potentially because of clogging or plugging when printing resumes. Generally, nozzle(s) may become clogged (i.e., impeded, slowed) or plugged (i.e., obstructed, substantially or completely closed) by a viscous plug that forms in the nozzle(s) as a result of solvent loss, crusting of the ink, and/or kogation of various ink components in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is a misdirection of ink through the nozzle's orifice to a lesser or greater degree, or a complete blockage, which can be measured by visually inspecting a printed image.

The term "reticulation" refers to a printing defect characterized by a withdrawal of ink film from portions of the substrate due to incompatibilities between the inkjet ink and the surface of the substrate. Reticulation often causes images to be produced with an "orange peel" or "pinhole" effect.

Throughout the specification, the term "boiling point" (b.p.) refers to the boiling point of a liquid measured at sea-level atmospheric pressure (i.e., 760 mmHg or 1 atmosphere), also called the normal boiling point, unless specified otherwise.

Inkjet Inks

The present disclosure is directed to inkjet inks that possess suitable physical/chemical stability—for example, are not prone to settling—at both ambient temperatures and printhead operating conditions, are jetted reliably, exhibit good adhesion to porous and non-porous substrates, have prolonged decap times while still drying quickly after being applied onto a substrate, and can provide metallic printed images of high gloss.

Inkjet inks of the present disclosure generally include the following components: (A) metal nanoparticles, (B) trimethylene glycol, and (C) 1,2-hexanediol.

Inkjet inks of the present disclosure may also optionally include one or more of (D) water, (E) a glycol co-solvent, (F) an alkanolamine, and (G) an additive.

(A) Metal Nanoparticles

Inkjet inks of the present disclosure are formulated with metal nanoparticles (A)—the component primarily responsible for providing a metallic film with high metallic luster forming the metallic printed images. The metal nanoparticles (A) may be employed in any amount that provides metallic printed images of acceptable quality whilst maintaining stability and jettability of the inkjet ink. Typically, the metal nanoparticles (A) are present in an amount of at least 1 wt. %, preferably at least 2 wt. %, preferably at least 4 wt. %, preferably at least 6 wt. %, preferably at least 8 wt. %, preferably at least 10 wt. %, preferably at least 12 wt. %, preferably at least 14 wt. %, more preferably at least 16 wt. %, even more preferably at least 17 wt. %, yet even more preferably at least 17.5 wt. %, and up to 25 wt. %, preferably up to 24 wt. %, preferably up to 23 wt. %, preferably up to 22 wt. %, preferably up to 21 wt. %, preferably up to 20 wt. %, more preferably up to 19 wt. %, even more preferably up to 18.5 wt. %, yet even more preferably up to 18 wt. %, based on a total weight of the inkjet ink. In terms of desirable print quality/legibility and glossiness, it is preferred that the metal nanoparticles (A) are present in an amount of greater than 10 wt. % and up to 25 wt. %, based on a total weight of the inkjet ink.

For use in thermal inkjet printing systems, it is desirable for the metal nanoparticles (A) to resist particle settling. Such non-settling characteristics may be achieved when metal nanoparticles (A) are used with an average particle size of less than 100 nm, preferably less than 95 nm, preferably less than 90 nm, preferably less than 85 nm, preferably less than 80 nm, preferably less than 75 nm, preferably less than 70 nm, preferably less than 65 nm, preferably less than 60 nm, more preferably less than 55 nm, even more preferably less than 50 nm, yet even more preferably less than 45 nm. For example, preferred metal nanoparticles (A) are those with an average particle size of from 10 nm, preferably from 20 nm, more preferably from 30 nm, even more preferably from 40 nm, and up to 90 nm, preferably up to 80 nm, preferably up to 70 nm, more preferably up to 60 nm, even more preferably up to 50 nm, yet even more preferably up to 45 nm. When metal nanoparticles (A) are employed that fall within the above-mentioned average particle size range, it is possible to produce inkjet inks with advantageous shelf-life and robust running stability. Accordingly, one advantage of the disclosed inkjet inks is their ability to be used in standard thermal inkjet printing systems without the need for specialized mechanical mechanisms (e.g., shaking or stirring mechanisms) to maintain particle suspension. The average particle size of the metal nanoparticles (A) may be measured, for example, using a laser particle analyzing system such as ELS-8000 available from Otsuka Electrics Co., Ltd. (cumulant analysis).

The form of the metal nanoparticles (A) is not particularly limiting, and spherical-shaped, polygonal (e.g., diamond-shaped, octagonal), thin sheet (e.g., disc or plate-like), etc. forms of the metal nanoparticles (A) may be used.

It is desirable that the metal nanoparticles (A) are of a size small enough to be readily and stably suspended within the inkjet inks, and after application onto a substrate, are able to coalesce to produce a metallic film with high legibility and gloss. Coalescence of the metal nanoparticles (A) into the metallic film occurs as the inkjet ink dries, and especially efficient coalescence can be achieved through the application of external heat, e.g., using a near infrared (NIR) heater.

Examples of metal nanoparticles (A) may include, but are not limited to, aluminum, silver, gold, platinum, nickel, chromium, tin, zinc, indium, titanium, and copper, inclusive of the elemental forms thereof as well as alloys thereof, and mixtures thereof.

From the viewpoint of their ability to coalesce and form metallic films with desirable gloss, silver nanoparticles are preferred. Silver nanoparticles have been found to be particularly advantageous for the formation of a metallic film, owing at least in part to the low specific heat capacity of metallic silver ($C_p$ of 0.233 J/g° C.), which enables rapid coalescence under mild applied heat, or even without external heat at all. For example, after application onto the substrate, the silver nanoparticles can be rapidly sintered using a near infrared heater or other heat source, resulting in coalescence of the silver nanoparticles and formation of a metallic film, sometimes in as little as 1 to 2 seconds. Such rapid and efficient formation of the metallic film allows the disclosed inkjet inks to be used in high throughput, line-run manufacturing.

Dispersions

The metal nanoparticles (A) may be provided in the form of a dispersion—a dispersion of the metal nanoparticles (A) in an appropriate organic solvent, and optionally with a dispersant. In some embodiments, the metal nanoparticles (A) are provided in the form of a dispersion having a content of metal nanoparticles (A) (i.e., active content) ranging from at least 5 wt. %, preferably at least 10 wt. %, preferably at least 15 wt. %, preferably at least 20 wt. %, preferably at least 25 wt. %, more preferably at least 30 wt. %, even more preferably at least 35 wt. %, yet even more preferably at least 40 wt. %, and up to 80 wt.; preferably up to 75 wt. %, preferably up to 70 wt. %, preferably up to 65 wt. %, more preferably up to 60 wt. %, even more preferably up to 55 wt. %, yet even more preferably up to 50 wt. %, based on a total weight of the dispersion. The amount of the dispersion added to make the inkjet ink may be varied depending on the active content of metal nanoparticles (A) contained in the dispersion, and ultimately on the overall desired loading of metal nanoparticles (A) in the inkjet ink.

In some embodiments, a density of the metal nanoparticle dispersion (e.g., silver nanoparticle dispersion) may range from at least 1.2 g/ml, preferably at least 1.25 g/ml, preferably at least 1.3 g/ml, preferably at least 1.35 g/ml, preferably at least 1.4 g/ml, more preferably at least 1.45 g/ml, even more preferably at least 1.5 g/ml, yet even more preferably at least 1.55 g/ml, and up to 1.85 g/ml, preferably up to 1.8 g/ml, preferably up to 1.75 g/ml, more preferably up to 1.7 g/ml, even more preferably up to 1.65 g/ml, yet even more preferably up to 1.6 g/ml.

Any appropriate organic solvent may be used in the dispersion, so long as the organic solvent is capable of dispersing the metal nanoparticles (A) and is compatible with the other components present in a particular inkjet ink. Preference is given herein to dispersions made using a glycol co-solvent, examples of which will be discussed hereinafter, with specific mention being made to propylene glycol.

In some embodiments, the metal nanoparticles (A) are stabilized and/or dispersed in the organic solvent using a dispersant. Any dispersant known to those of ordinary skill in the art for stabilizing/dispersing metal particles may be utilized herein, so long as the dispersant is compatible with the other components present in a particular inkjet ink. The dispersant may act as a ligand or capping agent to the metal nanoparticles (A) or may prevent their association or aggregation. The dispersant may be physically or chemically bonded/associated with the metal nanoparticles (A), examples of which include covalent bonding, hydrogen bonding, coordination complex bonding, ionic bonding, association via van der Waals forces or dipole-dipole interactions, or a mixture thereof.

The extent of the coverage of the dispersant on the surface of the metal nanoparticles (A) can vary, for example, from partial to full coverage, depending on the capability of the dispersant to stabilize and/or disperse the metal nanoparticles (A) in a particular organic solvent. Of course, there may be variability as well in the extent of coverage of the dispersant amongst the individual metal nanoparticles (A). The extent of coverage should be sufficient to increase dispersibility/stability of the metal nanoparticles (A) in the organic solvent of the dispersion, and ultimately in the solvent system of the inkjet ink, as compared to the same metal nanoparticles (A) that are not stabilized/dispersed with a dispersant. In light of the above, the amount of dispersant employed may vary, and can be readily determined by those of ordinary skill in the art. Typically, when used, the dispersant is added to the dispersion in an amount of at least 0.1 wt. %, preferably at least 0.5 wt. %, preferably at least 1 wt. %, preferably at least 1.5 wt. %, preferably at least 2 wt. %, more preferably at least 2.5 wt. 00 even more preferably at least 3 wt. %, yet even more preferably at least 3.5 wt. %, and up to 10 wt. %, preferably up to 9 wt. %, preferably up to 8 wt. %, preferably up to 7 wt. %, more preferably up to 6 wt. %, even more preferably up to 5 wt. %, yet even more preferably up to 4 wt. %, based on a total weight of the dispersion.

Types of dispersants acceptable for use herein include, but are not limited to, one or more of an organoamine dispersant, a sulfur-containing dispersant, and a polymeric dispersant.

Organoamine dispersants may be monoamines, polyamines, and/or heterocyclic amines containing up to 26 carbon atoms, preferably up to 22 carbon atoms, preferably up to 18 carbon atoms, preferably up to 12 carbon atoms, specific examples of which include, but are not limited to, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, diaminopentane, diaminohexane, diaminoheptane, diaminooctane, diaminononane, diaminodecane, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, N-methylpropylamine, N-ethylpropylamine, N-propylbutylamine, N-ethylbutylamine, N-ethylpentylamine, N-propylpentylamine, N-butylpentylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, N,N,N',N'-tetramethylbutane-1,4-diamine, pyridine derivatives (e.g., dodecyl pyridine), and mixtures of two or more thereof.

Sulfur-containing dispersants may contain a thiol group, a xanthate group, a thiocarbamate group, a thiourea group, or a derivative thereof. Specific examples of which include, but are not limited to, butanethiol, pentanethiol, hexanethiol, heptanethiol, octanethiol, decanethiol, dodecanethiol, 2-ethanedithiol, 1,2-ethanedithiol, 1,3-propanedithiol, 1,4-butanedithiol, xanthic acid, xanthate salts, and xanthate esters.

Polymeric dispersants may be homopolymeric or copolymeric dispersants, such as those formed from polymerization of one or more of:

(meth)acrylate monomers, including (meth)acrylate monomers having a polar or reactive group and hydrophobic (meth)acrylate monomers, such as i) (poly)alkylene glycol (meth)acrylates e.g., polyethylene glycol (meth)acrylate, polypropylene glycol (meth)acrylate, polyethylene glycol/polypropylene glycol (meth)acrylate, diethylene glycol mono methyl ether (meth)acrylate, polyethylene glycol mono methyl ether (meth)acrylate, triethylene glycol ethyl ether (meth)acrylate, and 2-(2-ethoxyethoxy) ethyl acrylate; ii) hydroxyl-containing (meth)acrylates e.g., hydroxyethyl (meth)acrylate, hydroxypropyl (meth)acrylate, and 2-hydroxy-3-phenyloxypropyl(meth)acrylate; iii) carboxylic acid (meth)acrylates e.g., (meth)acrylic acid; iv) glycidyl (meth)acrylates; v) amine-containing (meth)acrylates e.g., diethylaminoethyl (meth)acrylate and dimethylaminoethyl (meth)acrylate; vi) linear or branched alkyl (meth)acrylates e.g., butyl (meth)acrylate, sec-butyl (meth)acrylate, cetyl (meth)acrylate, decyl (meth)acrylate, dodecyl (meth)acrylate, ethyl (meth)acrylate, 2-ethylhexyl (meth)acrylate, hexyl (meth)acrylate, isoamyl (meth)acrylate, isobutyl (meth)acrylate, lauryl (meth)acrylate, methyl (meth)acrylate, octyl (meth)acrylate, propyl (meth)acrylate, stearyl (meth)acrylate, tridecyl (meth)acrylate, isostearyl (meth)acrylate, and behenyl (meth)acrylate; vii) cycloalkyl (meth)acrylates e.g., cyclohexyl (meth)acrylate, isobornyl (meth)acrylate, dicyclopentadienyl (meth)acrylate, and t-butylcyclohexyl (meth)acrylate; and viii) aryl-containing (meth)acrylates e.g., phenyl (meth)acrylate and 2-phenoxyethyl (meth)acrylate;

vinyl esters of aliphatic acids, such as vinyl acetate, vinyl propionate, vinyl caprylate, vinyl laurate, vinyl stearate;

allyl esters of aliphatic acids, such as allyl heptanoate, allyl acetate, allyl caprylate, and allyl caproate;

styrene and alkyl styrenes, such as styrene, alpha methyl styrene, and p-methylstyrene;

vinyl halides vinylidene halides, such as vinyl fluoride, vinyl chloride, and vinyl bromide, vinylidene fluoride and vinylidene chloride;

vinyl alkyl ketones, such as vinyl methyl ketone and vinyl ethyl ketone;

vinyl ethers, such as isobutyl vinyl ether, dodecyl vinyl ether, hydroxybutyl vinyl ether, cyclohexyl vinyl ether, 4-hydroxymethyl cyclohexylmethyl vinyl ether, and octadecyl vinylether;

vinylamides, such as N-vinyl-2-pyrrolidone and N-vinyl-2-caprolactam;

(meth)acrylamides, such as N-methylolacrylamide, N-methylolmethacrylamide, N-cyclohexyl(meth)acrylamide, and N,N-cyclohexylmethyl(meth)acrylamide;

conjugated dienes such as 1,3-butadiene, 2-chloro-1,3-butadiene, 2,3-dichloro-1,3-butadiene, and isoprene;

butenedioic acids and their derivatives such as maleic acid, maleic anhydride, and fumaric acid; and mixtures thereof.

Specific examples of suitable polymeric dispersants include, but are not limited to, polyacrylic acid (PAA), polymethacrylic acid, polyvinylpyrrolidone (PVP), acrylic acid/maleic acid copolymers, styrene/maleic anhydride copolymers, styrene/(poly)alkylene glycol (meth)acrylate/acrylic acid copolymers, and vinyl acetate/vinyl chloride copolymers including terpolymers. Preference is given herein to a polymeric dispersant, preferably a styrene/(poly)alkylene glycol (meth)acrylate/acrylic acid copolymer, with specific mention being made to a styrene/polyethylene glycol mono methyl ether acrylate/acrylic acid copolymer.

Other examples of polymeric dispersants may include, but are not limited to, polyaspartic acid, polyalkylene glycols (e.g., polyethylene glycols, polypropylene glycols, poly(ethylene/propylene glycol) copolymers), urea aldehyde resins, polyketone resins, polyester resins, polyurethanes, phenol resins, and cellulose-based resins (e.g., cellulose nitrate, cellulose acetate butyrate).

Any method known to those of ordinary skill in the art may be used to provide the dispersion of metal nanoparticles (A). In one non-limiting example, a polyol process is employed whereby a suitable amount of metal oxide, e.g., silver (I) oxide, is mixed with an organic solvent, preferably a glycol co-solvent, more preferably propylene glycol, and a dispersant (e.g., styrene/polyethylene glycol mono methyl ether acrylate/acrylic acid copolymer) to form a reaction mixture. The reaction mixture may then be heated at e.g., 30 to 50° C. for an appropriate amount of time (e.g., 30 minutes to 5 hours) to reduce the metal oxide, e.g., silver (I) oxide, and form a dispersion of metal nanoparticles (A), e.g., silver nanoparticles.

Solvent System

The selection of an appropriate solvent system may impact the reliability of the printing process, the properties/appearance of the printed ink product, the cost of the ink, and the overall printing process efficiency. For example in thermal inkjet printing, the choice of solvent system may 1) aid bubble formation during the jetting process resulting in reliable ink jetting, 2) affect the stability/volatility of the inkjet inks by changing the interaction dynamics between the solvent(s) and the various inkjet ink components and thus the decap behavior, kogation, dispersion stability, and/or drop trajectory, 3) impact the adhesion, rub and scratch resistance, and optical properties of the printed image through the interactive forces between the solvent system and the other inkjet ink components even though the solvent(s) may no longer be present, or may be present in lesser amounts, after drying, 4) influence the drying time after application or the equipment needed to dry the applied ink, and/or 5) effect the manufacturing cost, environmental impact, etc. of the inkjet ink.

In light of the above, the solvent system of the disclosed inkjet inks includes both (B) trimethylene glycol (TMG) and (C) 1,2-hexanediol. It has been discovered that such a combination provides inkjet inks containing metal nanoparticles (A) with robust stability during both printing operations and under extended decap conditions, desirable drying qualities, and makes it possible to produce glossy metallic images.

The amount of trimethylene glycol (B) employed may be adjusted to obtain the desired inkjet ink performance such as decap behavior and running stability, but trimethylene glycol (B) is generally present in an amount of at least 0.5 wt. %, preferably at least 1 wt. %, preferably at least 2 wt. %, preferably at least 4 wt. %, preferably at least 6 wt. %, preferably at least 8 wt. %, preferably at least 10 wt. %, preferably at least 12 wt. %, more preferably at least 14 wt. %, even more preferably at least 16 wt. %, yet even more preferably at least 17 wt. %, and up to 30 wt. %, preferably up to 28 wt. %, preferably up to 26 wt. %, preferably up to 24 wt. %, preferably up to 22 wt. %, preferably up to 20 wt. %, more preferably up to 19 wt. %, even more preferably up to 18 wt. %, yet even more preferably up to 17.5 wt. 00 based on a total weight of the inkjet ink. It is possible to use amounts of trimethylene glycol (B) above the aforementioned upper limit, although doing so has a tendency to increase the drying times of the inkjet ink (which may still be acceptable for certain applications).

In addition to the advantages described above, the combination of trimethylene glycol (B) and 1,2-hexanediol (C) has also been found to improve the compatibility between the inkjet ink and substrate surface thereby minimizing printing defects such as reticulation. Accordingly, it is preferred that 1,2-hexanediol (C) be present in an amount of at least 0.1 wt. %, preferably at least 0.5 wt. %, preferably at least 1 wt. %, preferably at least 1.5 wt. %, preferably at least 2 wt. %, more preferably at least 2.5 wt. %, even more preferably at least 3 wt. %, yet even preferably at least 3.5 wt. %, and up to 15 wt. %, preferably up to 13 wt. %, preferably up to 11 wt. %, preferably up to 10 wt. %, more preferably up to 9 wt. %, even more preferably up to 8 wt. %, yet even more preferably up to 7 wt. %, based on a total weight of the inkjet ink.

In some embodiments, the weight ratio of trimethylene glycol (B) to 1,2-hexanediol (C), (B):(C), may range from at least 0.1:1, preferably at least 0.2:1, preferably at least 0.25:1, preferably at least 0.5:1, preferably at least 1:1, more preferably at least 2:1, even more preferably at least 3:1, yet even more preferably at least 4:1, and up to 20:1, preferably up to 18:1, preferably up to 16:1, preferably up to 14:1, preferably up to 12:1, preferably up to 10:1, more preferably up to 8:1, even more preferably up to 6:1, yet even more preferably up to 5:1.

The inkjets inks of the present disclosure may also optionally include (D) water. Water (D) may be used, for example, to reduce the environmental impact of the inkjet inks (e.g., reduce the total volatile organic content (VOC)), the cost to manufacture the inkjet inks, the cost to purchase the inkjet inks, etc. Any type of water may be used, including, but not limited to, deionized (DI) water, ion-exchanged water, ultrapure water, and distilled water.

Generally, water (D) may be present in any amount up to 60 wt. % based on a total weight on the inkjet ink, for example from at least 15 wt. %, preferably at least 18 wt. %, preferably at least 20 wt. %, preferably at least 22 wt. %, preferably at least 24 wt. %, preferably at least 26 wt. % more preferably at least 28 wt. %, even more preferably at least 30 wt. %, yet even more preferably at least 32 wt. %, and up to 60 wt. %, preferably up to 58 wt. %, preferably up to 56 wt. %, preferably up to 54 wt. %, preferably up to 52 wt. %, preferably up to 50 wt. %, preferably up to 48 wt. %, preferably up to 46 wt. %, preferably up to 44 wt. %, more preferably up to 42 wt. %, even more preferably up to 40 wt. %, yet even more preferably up to 36 wt. %, based on a total weight of the inkjet ink.

In some embodiments, the weight ratio of water (D) to a sum of trimethylene glycol (B) and 1,2-hexanediol (C), (D):((B)+(C)), may range from at least 0.5:1, preferably at least 0.6:1, preferably at least 0.8:1, preferably at least 1:1, preferably at least 1.2:1, preferably at least 1.4:1, more preferably at least 1.6:1, even more preferably at least 1.8:1, yet even more preferably at least 2:1, and up to 15:1, preferably up to 13:1, preferably up to 11:1, preferably up to 9:1, more preferably up to 7:1, even more preferably up to 5:1, yet even more preferably up to 3:1.

In preferred embodiments, water (D) is the predominant solvent present in the inkjet inks, i.e., water (D) provides the highest individual weight percentage contribution of all solvents present. However, in certain instances, trimethylene glycol (B) may be the predominant solvent present in the inkjet inks, i.e., trimethylene glycol (B) provides the highest individual weight percentage contribution of all solvents present.

The solvent system may also optionally include a glycol co-solvent (E) to further improve performance, e.g., decap performance, print quality, etc., without substantially worsening ink dry times or causing undesired particle settling. The glycol co-solvent (E) refers herein to compounds containing two hydroxyl groups attached to different carbon atoms. Although the trimethylene glycol (B) and 1,2-hexanediol (C) described previously fall within this definition of glycol co-solvent (E), they are considered herein to be separate and distinct from glycol co-solvents (E) owing to their special behavior.

The glycol co-solvent (E) may contain at least 2 carbon atoms, preferably at least 3 carbon atoms, and up to 10 carbon atoms, preferably up to 8 carbon atoms, more preferably up to 6 carbon atoms, even more preferably up to 5 carbon atoms, yet even more preferably up to 4 carbon atoms. Preferred glycol co-solvents (E) are those containing two hydroxyl groups attached to adjacent carbon atoms (i.e., vicinal diols).

Examples of glycol co-solvents (E) include, but are not limited to, ethylene glycol, diethylene glycol, triethylene glycol, propylene glycol, dipropylene glycol, butylene glycol, neopentyl glycol, 1,2-butanediol, 1,3-butanediol, 1,4-butanediol, 2,3-butanediol, 1,5-pentanediol, 1,2-pentanediol, 2,4-pentanediol, 1,6-hexanediol, 2,5-hexanediol, 1,7-heptanediol, 1,2-octanediol, and 1,8-octanediol, which can be used singularly or in combination.

In preferred embodiments, the glycol co-solvent (E) is at least one selected from the group consisting of ethylene glycol, diethylene glycol, triethylene glycol, propylene glycol, dipropylene glycol, butylene glycol, 1,2-butanediol, 1,3-butanediol, 1,4-butanediol, and 2,3-butanediol, with ethylene glycol, propylene glycol, or both, being more preferred.

In terms of improving inkjet ink performance, e.g., decap performance, print quality, etc., without considerably lengthening ink dry times, preferred glycol co-solvents (E) are those which have a boiling point of from 188° C. to less than 250° C., preferably less than 240° C., preferably less than 230° C., preferably less than 220° C., more preferably less than 210° C., more preferably less than 200° C. In light of the above, preference is given herein to ethylene glycol, propylene glycol, or both.

When employed, the glycol co-solvent (E) may be present in the inkjet inks in an amount of at least 1 wt. %, preferably at least 3 wt. %, preferably at least 5 wt. %, preferably at least 7 wt. %, preferably at least 9 wt. %, preferably at least 11 wt. %, more preferably at least 13 wt. %, even more preferably at least 15 wt. %, yet even more preferably at least 17 wt. %, and up to 40 wt. %, preferably up to 38 wt. %, preferably up to 36 wt. %, preferably up to 34 wt. %, preferably up to 32 wt. %, preferably up to 30 wt. %, preferably up to 28 wt. %, preferably up to 26 wt. %, more preferably up to 24 wt. %, even more preferably up to 22 wt. %, yet even more preferably up to 20 wt. %, based on a total weight of the inkjet ink.

In addition to those solvents mentioned above, the solvent system may also optionally include one or more other organic solvents.

Examples of other organic solvents include, but are not limited to,
- alcohols such as methanol, ethanol, 1-propanol, 2-propanol, 1-butanol, 2-butanol, tert-amyl alcohol, 2-methyl-1-butanol, undecanols (e.g., 1-undecanol), dodecanols (e.g., 1-dodecanol), tridecanols (e.g., 1-tridecanol), tetradecanols (e.g., 1-tetradecanol), including terpene alcohols such as monoterpene alcohols (e.g., terpineol, geraniol, citronellol, linalool, etc.);
- polyols (other than trimethylene glycol (B), 1,2-hexanediol (C), and glycol co-solvents (E) described previously) such as glycerol.
- glycol ethers including monoalkyl glycol ethers, dialkyl glycol ethers, and monoalkyl monoester glycol ethers, such as ethylene glycol monomethyl ether, ethylene glycol monoethyl ether, ethylene glycol mono-isopropyl ether, ethylene glycol mono-n-propyl ether, ethylene glycol mono-t-butyl ether, ethylene glycol monobutyl ether, ethylene glycol mono-isobutyl ether, diethylene glycol monomethyl ether, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol monomethyl ether, propylene glycol methyl ether acetate, ethylene glycol dimethylether, diethylene glycol dimethylether, diethylene glycol methyl ethyl ether, diethylene glycol diethylether, dipropylene glycol dimethyl ether, dipropylene glycol mono-n-propyl ether;
- ethers (non-glycol ethers) such as diethyl ether, dipropyl ether, methyl tert-butyl ether, and tetrahydrofuran, dibutyl ether and dioxane;
- ketone solvents such as acetone, methyl ethyl ketone (MEK), methyl isopropyl ketone, 3-pentanone, methyl n-propyl ketone, ethyl isopropyl ketone, methyl isobutyl ketone, cyclohexanone, diacetone alcohol, 3-hexanone, and methyl n-butyl ketone;
- esters such as methyl acetate, ethyl acetate, n-butyl acetate, methyl lactate, ethyl lactate, butyl lactate, methoxyethyl acetate, ethoxyethyl acetate, methoxypropyl acetate, and ethoxypropyl acetate;
- amides such as dimethylformamide and dimethylacetamide;
- acetonitrile
- as well as mixtures of two or more thereof.

The other organic solvent(s) may be used in any amount desired for a particular application, with typical loadings ranging up to 20 wt. %, preferably up to 15 wt. %, preferably up to 10 wt. %, preferably up to 5 wt. %, more preferably up to 4 wt. %, even more preferably up to 2 wt. %, yet even more preferably up to 1 wt. %, based on a total weight of the inkjet inks, though higher loadings may sometimes be used. In some embodiments, the inkjet inks are substantially free of other organic solvents.

In preferred embodiments, the inkjet inks are substantially free of solvents having a boiling point higher than 255° C., preferably solvents having a boiling point higher than 250° C., preferably solvents having a boiling point higher than 245° C., more preferably solvents having a boiling point higher than 240° C., even more preferably solvents having a boiling point higher than 235° C., yet even more preferably solvents having a boiling point higher than 230° C.

In preferred embodiments, the solvent system consists of trimethylene glycol (B), 1,2-hexanediol (C), water (D), and one or more glycol co-solvent(s) (E) such as ethylene glycol and propylene glycol.

(F) Alkanolamine

The inkjet inks may optionally include an alkanolamine, which are alkane-based compounds that contain both hydroxyl (—OH) and amino (primary, secondary, or tertiary) groups.

In some embodiments, the alkanolamine (F) has a total of at least 2 carbon atoms, preferably at least 3 carbon atoms, preferably at least 4 carbon atoms, and up to 8 carbon atoms, preferably up to 7 carbon atoms, more preferably up to 6 carbon atoms, more preferably up to 5 carbon atoms.

In preferred embodiments, the alkanolamine (F) used in the inkjet inks herein has the following general formula (I):

wherein X, Y and Z are independently selected from the group consisting of
hydrogen;
a $C_1$-$C_5$ alkyl group, preferably a $C_2$-$C_3$ alkyl group; and
an alkanol group, preferably a $C_2$-$C_5$ alkanol group, more preferably a $C_2$-$C_3$ alkanol group;
wherein at least one of X, Y and Z is an alkanol group (an alkyl substituent that bears at least one hydroxyl group).

In some embodiments, one of X, Y, and Z is an alkanol group. In some embodiments, two of X, Y, and Z are an alkanol group. In some embodiments, X, Y, and Z are all alkanol groups.

With respect to the one or more alkanol groups, the alkyl chain thereof may contain branching. Alternatively, the alkyl chain of the alkanol group may be linear (contains no alkyl branching). In preferred embodiments, the alkanol group(s) is based on a linear alkyl chain. Further, the hydroxyl bearing carbon of the alkanol group may be a primary, secondary, or tertiary carbon, preferably the hydroxyl bearing carbon is a primary or secondary carbon.

The alkanolamine (F) may contain a primary amino group (i.e., two of X, Y, and Z are hydrogen), a secondary amino group (i.e., one of X, Y, and Z are hydrogen), or a tertiary amino group (i.e., X, Y, and Z are all non-hydrogen). When an alkanolamine (F) is employed that contains a secondary amino group, the two non-hydrogen substituents may be the same or different alkanol groups, preferably the same alkanol group, for example as is the case in diethanolamine.

When an alkanolamine (F) is employed that contains a tertiary amino group, the three non-hydrogen substituents may be the same or different alkanol groups, preferably the same alkanol group, for example as is the case in triethanolamine.

Suitable examples of the alkanolamine (F) include, but are not limited to, ethanolamine, N-methylethanolamine, N,N-dimethylethanolamine, N-ethylethanolamine, N-propylethanolamine, N-isopropylethanolamine, N,N-diisopropylethanolamine, N-butylethanolamine, diethanolamine, N-methyldiethanolamine, N-ethyldiethanolamine, triethanolamine, propanolamine (3-Amino-1-propanol), N-methylpropanolamine, N,N-dimethylpropanolamine, dipropanolamine, tripropanolamine, isopropanolamine, N,N-dimethylisopropanolamine, diisopropanolamine, triisopropanolamine, 2-amino-2-methyl-1-propanol, 2-amino-2-ethyl-1,3-propanediol, 4-amino-1-butanol, 2-amino-1-butanol, sec-butanolamine, and di-sec-butanolamine. In preferred embodiments, the alkanolamine (F) is at least one selected from the group consisting of ethanolamine, propanolamine, isopropanolamine, diethanolamine, and triethanolamine, with isopropanolamine and triethanolamine being more preferred.

In some embodiments, the alkanolamine (F) is present in the inkjet inks in amounts of at least 0.1 wt. %, preferably at least 0.2 wt. %, preferably at least 0.3 wt. %, preferably at least 0.4 wt. %, preferably at least 0.5 wt. %, preferably at least 0.6 wt. %, preferably at least 0.7 wt. %, more preferably at least 0.8 wt. %, even more preferably at least 0.9 wt. %, yet even more preferably at least 1 wt. %, and up to 10 wt. %, preferably up to 8 wt. %, preferably up to 6 wt. %, preferably up to 5 wt. %, preferably up to 4 wt. %, more preferably up to 3 wt. %, even more preferably up to 2 wt. %, yet even more preferably up to 1.5 wt. %, relative to the total weight of the inkjet inks. In some embodiments, the weight ratio of the metal nanoparticles (A) to the alkanolamine (F) ((A):(F)) is at least 3:1, preferably at least 5:1, preferably at least 7:1, more preferably at least 9:1, even more preferably at least 11:1, yet even more preferably at least 13:1, and up to 30:1, preferably up to 28:1, preferably up to 26:1, preferably up to 24:1, preferably up to 22:1, more preferably up to 20:1, even more preferably up to 18:1, yet even more preferably up to 16:1.

(G) Additives

In addition to the components already mentioned, the inkjet inks may also be optionally formulated with various additives (G) to improve various ink characteristics and performance. For example, the inkjet inks may optionally contain a preservative and/or an anticorrosion inhibitor.

Preservatives, such as biocides, fungicides, or any other antimicrobial, may be added to inkjet inks to inhibit the growth of microorganisms and prevent spoilage from bacteria, yeasts, fungi, etc., in particular in inkjet inks formulated with water (D). Examples of suitable preservatives include, but are not limited to, sodium benzoate; glutaraldehyde and related products; pentachlorophenol sodium; 2-pyridinethiol-1-oxide sodium; sodium sorbate; sodium dehydroacetate; 2,2-dibromo-3-nitrilopropionamide; 1-(3-chloroallyl)-3,5,7-triaza-1-azoniaadamantane chloride; and isothiazolinone heterocyclic compounds such as benzisothiazolinone (1,2-dibenzothiazolin-3(2H)-one), methylisothiazolinone, and chloromethylisothiazolinone. Commercially available biocides include, but are not limited to, UCARCIDE antimicrobials (available from Dow), PROXEL antimicrobials (available from Lonza) such as PROXEL GXL (20 wt. % solution of 1,2-benzisothiazolin-3-one in aqueous dipropylene glycol) and PROXEL AQ, DOWICIL biocides such as DOWICIL QK-20 and DOWICIL 75 (available from Dow), NUOSEPT preservatives (available from IMCD), and TROYSAN preservatives (available from Troy Chemical Corp.). The preservatives may be used alone or in combination. When used, the preservatives may be included in the inkjet inks in an amount of from at least 0.0001 wt. %, preferably at least 0.001 wt. %, more preferably at least 0.01 wt. %, even more preferably at least 0.02 wt. %, yet even more preferably at least 0.04 wt. %, and up to 2 wt. %, preferably up to 1 wt. %, preferably up to 0.5 wt. %, preferably up to 0.4 wt. %, preferably up to 0.3 wt. %, more preferably up to 0.2 wt. %, even more preferably up to 0.1 wt. %, yet even more preferably up to 0.05 wt. %, relative to the total weight of the inkjet inks.

The inkjet inks may optionally contain a corrosion inhibitor. Suitable corrosion inhibitors include, but are not limited to, phosphonates, phosphonic acids, triazoles (e.g., benzotrazole, tolyltriazole, carboxybenzotriazole, as well as salts thereof such as sodium, potassium, etc. salts), organic amines (e.g., aliphatic amines, aromatic amines, monoamines, diamines, triamines, polyamines, and salts thereof), alkoxylated organic amines, sorbitan esters, carboxylic acid derivatives (e.g., propionic acid derivatives of organic amines), sarcosinates (e.g., acids or salts), phosphates, zinc, nitrates, chromium, molybdenum-containing components, and borate-containing components. Exemplary commercially available corrosion inhibitors include, but are not limited to, DEQUEST corrosion inhibitors (available from Italmatch Chemicals); COBRATEC corrosion inhibitors such as COBRATEC TT-100, COBRATEC TT50S (50 wt. % aqueous solution of sodium tolyltriazole), COBRATEC BZ, COBRATEC CBT, COBRATEC TT85, COBRATEC TT55K, COBRATEC 40S, and COBRATEC TT-25-EG (available from PMC Specialties Group, Inc.); AMP products such as AMP-95 (available from Angus Chemical Company); DUOMEEN products such as DUOMEEN O and DUOMEEN C, and DUOMEEN CD (available from Nouryon); DETHOX AMINE (e.g., C Series) (available from DeForest Enterprises); DERIPHAT products such as DERIPHAT 160 C (available from BASF); MAXHIB products (e.g., AC Series) (available from PCC Chemax, Inc.); and HAMPOSYL products (available from Chattem Chemicals, Inc.). The corrosion inhibitors may be used alone or in combination. When used, the corrosion inhibitors may be included in the inkjet inks in an amount of from at least 0.0001 wt. %, preferably at least 0.001 wt. %, more preferably at least 0.01 wt. %, even more preferably at least 0.05 wt. %, yet even more preferably at least 0.1 wt. %, and up to 2 wt. %, preferably up to 1 wt. %, preferably up to 0.5 wt. %, more preferably up to 0.4 wt. %, even more preferably up to 0.3 wt. %, yet even more preferably up to 0.2 wt. %, relative to the total weight of the inkjet inks. In some embodiments, the weight ratio of the corrosion inhibitor to the metal nanoparticles (A) is at least 0.0005:1, preferably at least 0.001:1, preferably at least 0.002:1, preferably at least 0.003:1, preferably at least 0.004:1, preferably at least 0.005:1, and up to 0.02:1, preferably up to 0.018:1, preferably up to 0.016:1, preferably up to 0.014:1, preferably up to 0.012:1, preferably up to 0.01:1, preferably up to 0.008:1, preferably up to 0.006:1, preferably up to 0.0058:1.

Other additives (G) which may optionally be included in the disclosed inkjet inks in art appropriate levels include, inter alia, a colorant, an opacifying agent, a surfactant, a resin, an anti-kogation agent, a stabilizer, a security taggant, etc.

It is to be readily appreciated by those of ordinary skill in the art that one or more colorants may be optionally included in the inkjet inks to augment the metallic color range, and the inkjet inks are not limited to any particular color. Any colorant can be employed in the inkjet inks to provide the desired color, including dyes, pigments, mixtures thereof, and the like, provided that the colorant can be dissolved or stably dispersed within the inkjet inks. Suitable colors include, for example, cyan, magenta, yellow, and key (black) ("CMYK"), white, orange, green, light cyan, light magenta, violet, and the like, including both spot colors and process colors. In general, the colorant(s) may be present in amounts of at least 0.1 wt. % preferably at least 0.5 wt. %, preferably at least 1 wt. %, preferably at least 2 wt. %, more preferably at least 3 wt. %, even more preferably at least 5 wt. %, yet even more preferably at least 6 wt. %, and up to 20 wt. %, preferably up to 15 wt. %, more preferably up to 10 wt. %, even more preferably up to 8 wt. %, yet even more preferably up to 7 wt. %, relative to the total weight of the inkjet inks. The inkjet inks can be formulated with various dyes, with particular preference given to metal complex dyes and organic dyes, specific and non-limiting examples of which include those dyes in the WATER color series such as ACID YELLOW 23, ACID RED 18, DIRECT BLUE 87, etc.; VALIFAST color series such as VALIFAST BLACK 3870, VALIFAST RED 1355, and VALIFAST YELLOW 3150 (which are azo-metal complex dyes); each available from Orient Chemical Industries Co., Ltd. The inkjet inks can be formulated with any inorganic pigment and/or organic pigment, provided the pigment does not negatively impact the running stability of the inkjet ink to a substantial degree. In addition to providing color to the inkjet inks, such pigments may be capable of improving the light resistance, the weather resistance, etc., of the printed images. Examples of pigments include, but are not limited to, pigment dispersions in the BONJET black series, available from Orient Chemical Industries Co., Ltd.

The inkjet inks may optionally contain one or more opacifying agents, examples of which may include, but are not limited to, titanium dioxide, zirconium silicate, zirconium oxide, tin oxide, cerium oxide, zinc oxide, aluminum oxide, silica, kaolin, calcium carbonate, magnesium carbonate, calcium magnesium carbonate, barium carbonate, sodium feldspar, potassium feldspar, nepheline, calcium silicate, mullite, wollastonite, and talc.

The inkjet inks may optionally contain one or more surfactants. Such surfactants may be present in amounts of at least 0.01 wt. %, preferably at least 0.05 wt. %, more preferably at least 0.1 wt. %, even more preferably at least 0.5 wt. %, yet even more preferably at least 1 wt. %, and up to 5 wt. %, preferably up to 4 wt. %, more preferably up to 3 wt. %, even more preferably up to 2.5 wt. %, yet even more preferably up to 2 wt. %, preferably up to 1.5 wt. %, based on a total weight of the inkjet ink. Such additional surfactants may include, but are not limited to:

polysiloxanes including organomodified silicones (e.g., alkyl, aryl, and/or arylalkyl modified silicones) such as SILTECH C-32, available from Siltech Corporation, COATOSIL 1211C and 3573, each available from Momentive, KF-410 (an arylalkyl-modified polydimethylsiloxane), available from Shin-Etsu Chemical Co., and BYK-322 and BYK-323 (arylalkyl-modified poly(dimethylsiloxane-co-methylalkylsiloxane)), each available from BYK Additives & Instruments;

silicone acrylate copolymers, including those obtained by polymerization (e.g., free-radical polymerization) or grafting of a polyorganosiloxane macromer (e.g., those having a polydimethylsiloxane backbone, a poly(dimethylsiloxane-co-methylphenylsiloxane) backbone, a poly(dimethylsiloxane-co-diphenylsiloxane) backbone, or a poly(dimethylsiloxane-co-methylalkylsiloxane) backbone) comprising at least one polymerizable group (e.g., a vinyl or (meth)acrylate-containing group on one of the ends of the polyorganosiloxane chain, on both ends of the polyorganosiloxane chain, or on the silicone backbone) and a (meth)acrylate monomer, such as KP-541, KP-543, KP-545, KP-550, KP-575 (acrylic polymers grafted with polydimethylsiloxane side chains, available from Shin-Etsu Chemical Co., Ltd.), BYK-3550 (available from BYK Japan K.K.);

fluoropolymers such as FC-4430 and FC-4432, available from 3M Corporation;

polyether modified silicones, including those which are block copolymers having a pendent graft structure formed from a linear or branched polydimethylsiloxane backbone containing one or more polyether side chains and optionally one or more fatty alkyl side chains, such as KF-6013 (PEG-9 dimethicone, uncapped, HLB=10.0), KF-6015 (PEG-3 dimethicone, uncapped, HLB=4.5), KF-6017 (PEG-10 dimethicone, uncapped, HLB=4.5), and KF-6038 (Lauryl PEG-9 polydimethylsiloxyethyl dimethicone, uncapped, HLB=3.0), each available from Shin-Etsu Chemical Co.;

photo-cross-linkable silicone acrylates or silicone polyether acrylates such as TEGO RAD 2100, TEGO RAD 2200, TEGO RAD 2250, TEGO RAD 2300 (silicone polyether acrylate), each available from Evonik Industries, and BYK-UV 3500 and 3530, available from BYK;— polyacrylates including polyacrylate copolymers and cross-polymers such as BYK-381 and BYK-361N (polyacrylate copolymer), each available from BYK, PEMULEN EZ-4U (acrylate/C10-C30 alkyl acrylate crosspolymer) and PEMULEN TR-2 (acrylic acid/C10-C30 alkyl acrylate crosspolymer), each available from Lubrizol;

acetylenic diol and acetylenic glycol-based gemini surfactants such as SURFYNOL SEF and DYNOL surfactants, available from Evonik Industries;

polysiloxane-based gemini surfactants such as TEGO TWIN 4100, available from Evonik Industries;

non-ionic polyethers for example as substrate wetting surfactants such as TEGO WET 510 (hydrophilic polyether substrate wetting surfactant), available from Evonik Industries;

ethoxylated fatty amines, such as AMIET 102, AMIET 105, AMIET 302, AMIET 308, AMIET 320, AMIET 502, AMIET 505, and AMIET 515, each available from Kao;

amides of fatty acids, including alkanolamides of fatty acids and alkoxylated alkanolamides of fatty acids, such as coconut fatty acid monoethanolamide, coconut fatty acid monoethanolamide reacted with 2-20 moles of ethylene oxide, cocamide diethanolamine (DEA), lauramide DEA, linoleamide DEA, myristic amide DEA, palmitic amide DEA, and oleamide DEA, with specific mention being made to AMFNON L-02 (lauramide DEA) and AMINON PK-02S (palm kernel amide DEA), each available from Kao;

ethers, such as alkoxylated $C_1$-$C_{22}$ alcohols including alkoxylated fatty alcohols such as BIO-SOFT N-600 (C12-C13 alcohol ethoxylate), MAKON DA-4 (ethoxylated isodecyl alcohol), MERPOL SE (alcohol ethoxylate), and POLYSTEP TD-6 (ethoxylated tridecyl alcohol), each available from Stepan, ethylene oxide/propylene oxide copolymers, alkoxylated alkylphenols, and alkyl polyglycosides (APGs) such as those made from reaction between fatty alcohols and glucose;

fatty esters such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters like sorbitan monolaurate (e.g., EMASOL L-10V, available from Kao) and polysorbates including mono-, bi- or tri-fatty acid esterified polysorbates such as TOXIMUL SEE-340 (sorbitan trioleate ethoxylate (20)), available from Stepan; and glycosides of fatty alcohols such as PLANTASENS NATURAL EMULSIFIER HE20 (cetearyl glucoside, sorbitan olivate), available from Clariant;

sulfates, sulfonates, phosphates, and phosphonates, such as alkyl sulfates, alkyl-ester-sulfates, alkyl ether sulfates, alkyl-alkoxy-ester-sulfate, sulfated alkanolamides, glyceride sulfates, alkyl sulfonates, fatty alkyl-benzene sulfonates, lower alkyl-benzene sulfonates, alpha olefin sulfonates, lignosulfonates, alkyl aryl ether phosphates, alkyl ether phosphates, and phosphates of fatty alcohols or polyoxyalkylene ethers of fatty alcohols; and amphoteric surfactants including, but not limited to: fatty alkyl betaines such as lauryl betaine (e.g., AMPHITOL 24B, available from Kao); fatty alkyl amido betaines such as fatty amidopropyl dimethylamino betaine; fatty alkyl sultaines such as fatty dimethyl hydroxysultaine; fatty alkyl amido sultaines such as fatty amido propyl dimethylamino hydroxysultaine; amine oxides, such as N-cocoamidopropyl dimethyl amine oxide, dimethyl fatty alkyl amine oxides such as dimethyl coco amine oxide, lauryldimethyl amine oxide (e.g., AMPHITOL 20N, available from Kao); and imidazole-based amphoteric surfactants (e.g., ELEC AC, available from Kao).

The inkjet inks may optionally contain one or more resins. The resin(s) may be present in the inkjet inks in an amount of at least 0.1 wt. %, preferably at least 0.2 wt. %, preferably at least 0.5 wt. %, preferably at least 0.8 wt. %, more preferably at least 1 wt. %, even more preferably at least 1.5 wt. %, yet even more preferably at least 2 wt. %, and up to 5 wt. %, preferably up to 4.5 wt. %, preferably up to 4 wt. %, more preferably up to 3.5 wt. 00 even more preferably up to 3 wt. %, yet even more preferably up to 2.5 wt. %, based on a total weight of the inkjet ink. Examples of resins include, but are not limited to, phenol resins (i.e. copolymers of phenolic compounds with formaldehyde), for example novolak resins such as PHENOLITE TD-2131 and PHENOLITE TD-2090 available from DIC Corp.;

terpene phenol resins (i.e., copolymeric reaction products from alkylation of one or more phenolic compounds with one or more terpenes), for example, YS POLYSTER products such as YS POLYSTER U130, YS POLYSTER U115, YS POLYSTER T160, and YS POLYSTER T145, available from Yasuhara Chemical Co. Ltd., and DERTOPHENE products such as DERTOPHENE T, DERTOPHENE T105, DERTOPHENE T115, and DERTOPHENE T160, available from DRT/Pinova.

phenol-modified hydrocarbon resins, such as those formed from polymerization of one or more of indene, vinyl toluene, and dicyclopentadiene in the presence of a phenolic compound rosin resins, including, but not limited to: rosin ester resins, such as e.g., an ester of a rosin composed mainly of an abietic type or pimaric type resin acid that has been reacted with an alcohol(s) such as glycerin, pentaerythritol, ethylene glycol, diethylene glycol, triethylene glycol, methanol, etc., and optionally hydrogenated or partially hydrogenated, with specific mention being made to HARIESTER products available from Harima Chemicals, Inc., STAYBELITE ESTER 10-E and PERMALYN 6110, each available from Eastman, SUPER ESTER A-125, SUPER ESTER A-75, PENSEL D-125, PINECRYSTAL KE-359 available from Arakawa Chemical Industries, Ltd., and FORAL 85, FORAL 105, HERCOLYN products, PEXALYN products, and PENTALYN products available from Pinova; hydrogenated acidic rosins such as FORAL AX and FORAL DX, each available from Pinova; partially hydrogenated acidic rosins such as STAYBELITE RESIN-E, available from Eastman, and STAYBELITE and STAYBELITE A, each available from PINOVA; dimerized rosins such as POLY-PALE partially dimerized rosin available from Eastman; and functionalized rosin resins, for example an ester (e.g., glycerol ester) of a rosin which has been modified with maleic anhydride or a rosin which has been subject to carboxylic acid reduction conditions, with specific mention being made to LEWISOL 28-M and Abitol-E hydroabietyl alcohol, each available from Eastman;

polyamide resins, for example VERSAMID 725, 744, 756, 759 available from BASF Japan Ltd., TOHMIDE 90, 92, 394-N available from Sanho Chemical Co. Ltd., and SUNMIDE 550, 554, 615A, 638, 640 available from Evonik;

epoxy resins including sulfonamide-modified epoxy resins for example AD-PRO MTS available from Rit-Chem;

(meth)acrylate and styrene/(meth)acrylate resins (acrylic resins) for example JONCRYL 63, JONCRYL 67, JONCRYL 586, JONCRYL 611, JONCRYL 678, JONCRYL 682, JONCRYL 693, available from BASF, PARALOID DM-55 and PARALOID B-66, available from Palmer Holland, PARALOID B-72, available from Dow Chemical, USA, and ELVACITE 2013, available from Lucite Inc.;

polyurethane resins, such as those formed from reaction between (i) polyols including, but not limited to, ethylene glycol, propylene glycol, propanediol, butanediol, polyethylene glycol, polypropylene glycol, polytetrahydrofuran diol, 3-methyl-1,5-pentanediol, 1,9-nonanediol, polyester polyols such as polyethylene glycol adipate diol, polyethylene glycol succinate diol, poly(3-methyl-1,5-pentanediol adipate) glycol, poly(3-methyl-1,5-pentanediol terephthalate) glycol, carbonate polyols, and (ii) diisocyanates including, but not limited to, 2,4-toluene diisocyanate, 2,6-toluene diisocyanate, 4,4-diphenylmethane diisocyanate, hexamethylene diisocyanate, and isophorone diisocyanate; for example PERMAX 200, PERMAX 202, and SANCURE 20025F, available from Lubrizol;

polyvinyl butyral resins, for example PIOLOFORM BN 16 and MOWITAL B20H available from Kuraray America, Inc.;

polyhydroxystyrene resins such as poly(p-hydroxy styrene) from DuPont;

vinyl resins, for example UCAR VYHH, VMCH, VMCA, and VAGF, available from Dow Chemical Company, and VINNOL E15/45, H14/36, E15/45M, and E16/40A, available from Wacker Chemie AG, Germany;

sulfonamide modified formaldehyde resins such as p-toluene sulfonamide formaldehyde resin;

cellulose ester resins such as cellulose acetate butyrate (CAB-551-0.01) available from Eastman;

ethylene copolymers (including block copolymers) such as ethylene/vinyl acetate copolymers, ethylene/vinyl acetate/maleic anhydride terpolymers, ethylene butyl acrylate copolymer, and ethylene/acrylic acid copolymer;

as well as polyesters, sulfonated polyesters, polyolefins, cellulose ethers, cellulose nitrate resins, polymaleic anhydrides, acetal polymers, poly(styrene-allyl) alcohols, melamine formaldehyde resins, sulfonamide-modified melamine formaldehyde resins, ketone-aldehyde resins, and polyketone resins;

as well as mixtures thereof.

In some embodiments, the disclosed inkjet inks are substantially free of one or more of a colorant, an opacifying agent, a surfactant, a resin, an anti-kogation agent, a stabilizer, and a security taggant.

Methods of Making

Embodiments of the inkjet inks described herein may be prepared by any suitable technique known to those of ordinary skill in the art, for example by combining the metal nanoparticles (A), trimethylene glycol (B), 1,2-hexanediol (C) and any optional component such as water (D), glycol co-solvent (E), alkanolamine (F), and/or an additive (G) (e.g., preservative, anticorrosion inhibitor, etc.), in any order and mixing (e.g., stirring, agitating, and/or homogenizing) at a temperature between 2° and 100° C. until a homogeneous suspension is formed.

In one example, the inkjet ink may be made by first combining water (D) and alkanolamine (F) with any optional additive (G) (e.g., a preservative and anticorrosion inhibitor) in a vessel and mixing. Next, the trimethylene glycol (B), 1,2-hexanediol (C), and if desired, a glycol co-solvent (E), may be added and the resulting mixture mixed, for example for at least 1 minutes, preferably at least 5 minutes, preferably at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes. Then, the metal nanoparticles (A) may be added to the mixture with continued mixing for at least 5 minutes, preferably at least 10 minutes, preferably at least 15 minutes, preferably at least 20 minutes, preferably at least 25 minutes, preferably at least 30 minutes or otherwise until a homogeneous suspension is formed. The resulting inkjet ink may then be placed into a suitable printing cartridge, such as HP45SI made by Hewlett Packard or a KJ4B printhead made by Kyocera.

Properties

Among other advantages, the inkjet inks disclosed herein possess extended decap times, excellent running stability, provide glossy metallic printed images, and have quick drying properties.

The inkjet inks disclosed herein possess extended decap times as measured by printing a Raster Line Test, exposing the inkjet ink to air (decapping the ink cartridge) for a particular time (e.g., 1, 5, 10, or 30 minutes), reprinting the same Raster Line Test, and comparing the reprinted image after decapping to the original image to determine if any rasters were lost. If no loss of rasters occurs at the tested time interval, then the inkjet inks are given a "G" (Good) decap rating for that time interval. If 1-4 rasters are lost at the tested time interval, then the inkjet inks are given an "A" (Acceptable) decap rating for that time interval. If 5 or more rasters are lost at the tested time interval, then the inkjet inks are given an "NG" (Not Good) decap rating for that time interval. Inkjet inks which maintain a "G" or "A" decap rating, preferably a "G" decap rating, when decapped for 1 minute or longer, preferably 2 minutes or longer, preferably 3 minutes or longer, preferably 4 minutes or longer, preferably 5 minutes or longer, preferably 10 minutes or longer, preferably 20 minutes or longer, more preferably 30 minutes or longer, even more preferably 45 minutes or longer, yet even more preferably 60 minutes or longer, are considered desirable in terms of decap performance.

To test the inkjet inks for running stability, a narrow line image (e.g., barcode) (1 mm*1 cm, narrow lines, Monochrome bitmap) may be printed uninterrupted for a consecutive number of prints (e.g., 500 prints in a continuous printing operation), and the print quality may be assessed by visually inspecting certain prints (e.g., $500^{th}$ print) for missing nozzles. If no loss of lines/loss of line clarity occur in the print being inspected, then the inkjet ink is given a "G" (Good) running stability rating for that print. If 1-2 lines are lost/lost clarity in the print being inspected, but not enough to significantly affect the clarity or readability of the narrow line image, then the inkjet ink is given an "A" (Acceptable) running stability rating for that print. If more than 2 lines are lost/lost clarity in the print being inspected, then the inkjet ink is given an "NG" (Not Good) running stability rating for that print. Inkjet inks which maintain a "G" or "A" rating, preferably a "G" rating, when printed for at least 100 prints, preferably at least 200 prints, preferably at least 300 prints, preferably at least 400 prints, preferably at least 500 prints, preferably at least 1,000 prints, preferably at least 2,000 prints, preferably at least 3,000 prints, preferably at least 4,000 prints, preferably at least 5,000 prints, are considered desirable in terms of running stability (ability to remain dispersed/suspended without settling/sedimentation and improper jetting).

To test the inkjet inks for glossiness (metallic luster or a mirror-like appearance or light-reflective quality), the inkjet inks may be used to print a solid block image (e.g., 1 cm*10 cm) onto a black substrate such as the black portion of the Form 2C Opacity Chart, available from Leneta Company, Inc. The image may then be visually inspected for light-reflective qualities, with images having a mirror-like finish being rated as "glossy," and images with a hazy, dull, or non-reflective finish being rated as "not glossy." Inkjet inks which provide a glossy finish are considered herein to be desirable.

The drying properties of the inkjet inks may be measured by applying the inkjet inks in the form of a solid block image (e.g., 1 cm*10 cm) onto a substrate, and subjecting them to one or more passes under a near infrared (NIR) heater (e.g., for example using the drying parameters described in the Examples section). After each pass, an abrasion test by finger may be performed to test if color transfers from the metallic printed image to the finger. If color transfer occurs, then the metallic printed image is subjected to an additional pass under the NIR heater and the abrasion test repeated. This process may be repeated until no color transfer occurs (i.e., the inkjet ink is completely dried). Inkjet inks which are dried (no color transfer) after a single (1) pass under the NIR heater are rated "G" (Good); Inkjet inks which are dried (no color transfer) after two (2) passes under the NIR heater are rated "A" (Acceptable); Inkjet inks which are dried (no color transfer) after three (3) or more passes under the NIR heater are rated "NG" (No Good) in terms of drying properties. Preferred inkjet inks are those which are rated "G" or "A", preferably "G", in drying properties.

Printed Article

The inkjet inks can be printed on various substrates including three dimensional parts as well as flat sheets or webs that are supplied in roll form, for the manufacture of a wide variety of printed articles. The substrates may possess various surface types, for example, a flat surface, a structured surface, such as grained surfaces, and a three-dimensional surface, such as curved and/or complex surfaces, which are notoriously difficult substrates owing to the long distance that the ink must travel to reach all parts of the curved and/or complex surface. Additionally, the substrate may be of a variety of colors, for example, the substrate may be black, amber, blue, green, red, white, etc. The printed article may thus contain a metallic film, formed from the disclosed inkjet ink, disposed on a surface of a substrate, including a colored surface of the substrate.

Printed articles may be suitable in the graphic arts, textiles, packaging (e.g., food packaging, pharmaceutical packaging, etc.), lottery, direct mail, business forms and publishing industries, examples of which include a tag or label, a lottery ticket, a publication, packaging (e.g., food packaging, pharmaceutical packaging, blister packaging, other various flexible packaging, etc.), a folding carton, a rigid container (e.g., a plastic cup or tub, glass containers, metal cans, bottles such as PET bottles, jars, and tubes), envelopes, corrugate, a point-of-sale display, and the like. Particularly preferred printed articles are those having a metallic film formed from the disclosed inkjet ink disposed on a dark colored printed article or a dark colored portion of the printed article. For example, the printed article may be a card in the graphic arts, a tinted or amber glass bottle (e.g., a soft drink bottle formed of tinted glass), a colored jar lid (e.g., a pickle jar lid made of metal), colored (e.g., black) tubing or piping, a colored computer component, consumer product packaging, etc. having a metallic printed image disposed thereupon.

The inkjet inks may be printed on porous (or penetrable) substrates, examples of which include, but are not limited to, non-coated paper (plain paper), wood, membranes, corrugate (corrugated cardboard/fiberboard), and fabrics (including, for example, but not limited to, woven fabric, non-woven fabric, and foil-laminated fabric).

The inkjet inks may also be printed on non-porous (or non-penetrable/non-penetration) substrates, for example, various plastics, glass, metals (e.g., steel, aluminum, etc.), and/or non-penetration papers (e.g., coated papers such as varnish coated papers), including, but not limited to, molded plastic or metal parts as well a flat sheets or rolls of plastic or metallic films. Examples include those substrates containing polyesters such as polyethylene terephthalate (PET), biaxially oriented polystyrene (OPS), polyolefins such as polyethylene (PE), polypropylene (PP), oriented polypropylene (OPP), and biaxially oriented polypropylene (BOPP), polylactic acid (PLA), nylon and oriented nylon, polyvinyl chloride (PVC), cellulose triacetate (TAC), polycarbonate, acrylonitrile butadiene styrene (ABS), polyacetal, polyvinyl alcohol (PVA), coated papers such as varnish coated papers, and metals such as steel and aluminum, and the like.

The printed article may be formed from a substrate having already received an undercoat or primer layer (e.g., a white undercoat or primer layer or a colored undercoat or primer layer), and wherein the inkjet inks of the present disclosure are applied onto at least a portion of the undercoat or primer layer. Alternatively, the printed article may be formed from a substrate in which no undercoat or primer layer has been added, and thus the inkjet ink of the present disclosure may be printed directly onto the bare substrate.

Method of Forming a Metallic Printed Image

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures for example about 35 μm×35 μm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other image patterns on the print medium. Since the nozzles are small, typically 10 μm to 40 μm in diameter, inks that minimize clogging are desired. In particular, since thermal inkjet (TIJ) is an open atmosphere print head design (the nozzle orifices are open to atmosphere and there is no valve seal at the orifice to allow ink pressurization), TIJ printing has historically suffered from poor performance during intermittent printing, where decap time (print idle time) causes premature drying of ink in and around the nozzles.

The present disclosure provides a method of forming a metallic printed image by applying the inkjet ink, in one or more of its embodiments, onto a surface of a substrate by a thermal inkjet printhead and drying the inkjet ink, thereby converting the inkjet ink into a metallic film forming the metallic printed image. Use of the inkjet inks described herein overcomes the settling problems and short decap times associated with traditional metallic pigmented inks, while also being capable of providing metallic images of high metallic luster (a "glossy" finish) in short drying times.

Any drop on demand printhead known to those of ordinary skill in the art of inkjet printing can be used as printing units in the present method, including continuous printheads, thermal printheads, electrostatic printheads, and acoustic printheads, preferably a thermal printhead (having a thermal transducer) is used. Typical parameters, such as, for example, printing resolution, printing speed, printhead pulse warming temperature, driving voltage and pulse length, can be adjusted according to the specifications of the printhead. Printheads which are generally suitable for usage in the methods herein have, for example, a droplet size in the range of 2 to 80 μL and a droplet frequency in the range of 10 to 100 kHz, and high quality prints may be obtained, for example, by setting the driving voltage to 8.0 to 12.0 Volts, the print speed up to 300 feet/minute, the pulse warming temperature to 25 to 45° C., and the pulse length to 0.7-2.5 microseconds, although values above or below these described may also be used and still obtain satisfactory prints.

Additionally, as the inkjet inks described herein possess excellent running stability (are not prone to particle settling during printing operations that results in clogged nozzles and defective jetting), there is no need to use printheads equipped with special mechanical mechanisms, such as shaking or stirring mechanisms, to maintain particles in suspension in the methods disclosed herein. Accordingly, the use of specialty printheads designed to maintain particle suspension via agitation is entirely optional, and in preferred methods herein, such specialty printheads are not employed.

Examples of suitable printheads for use in the disclosed methods include, but are not limited to, HP45SI made by Hewlett Packard and KJ4B printhead made by Kyocera.

The surface of the substrate may have already received an undercoat or primer layer, and thus the inkjet inks of the present disclosure may be applied onto at least a portion of the undercoat or primer layer. Alternatively, the surface of the substrate to which the inkjet inks are applied may contain no undercoat or primer layer, and thus the inkjet ink of the present disclosure may be printed directly onto the bare substrate.

After application, the inkjet ink is dried. Any drying technique that at least partially removes solvent from the applied inkjet ink, and results in the coalescence of the metal nanoparticles (A) to form a metallic film can be used in the present method. The drying technique may also disassociate/remove the optional dispersant from the metal nanoparticles (A).

In some embodiments, drying is achieved by allowing the applied inkjet ink to dry under ambient conditions (in air, at about 23° C.). In such embodiments, external heat is not applied to facilitate drying or to increase drying speeds (unassisted drying). For example, the inkjet ink may be allowed to dry for 5 minutes or less, preferably 4 minutes or less, preferably 3 minutes or less, preferably 2 minutes or less, preferably 1 minute or less, preferably 45 seconds or less, preferably 30 seconds or less, more preferably 15 seconds or less, even more preferably 10 seconds or less, yet even more preferably 5 seconds or less, or otherwise until a metallic film of acceptable quality is formed on the substrate surface.

In preferred embodiments, the inkjet ink is dried through the application of external heat using a heater or other type of heating device. The heater may dry the applied inkjet ink using thermal energy (e.g., hot air), infrared (IR) radiation including near infrared (NIR) radiation, ultraviolet (UV) radiation, radiation from the visible region of the spectrum, electron beam (EB) radiation, radiation from a laser source, intense pulsed light, and/or microwave radiation. Heating the inkjet ink using one or more of the above-mentioned heating techniques may facilitate coalescence and/or increase the speeds at which the metal nanoparticles (A) coalesce to form the metallic film. Heating may thus provide for rapid and efficient formation of the metallic film for use in high throughput, line-run manufacturing. The application of heat may also enhance the degree that the metal (e.g., silver) nanoparticles coalesce, which can produce auxiliary benefits such as improved adhesion and abrasion performance of the metallic printed image.

Particularly preferred methods involve drying the applied inkjet ink with a near infrared (NIR) heater to sinter the metal nanoparticles (A), thereby converting the inkjet ink into the metallic film (e.g., silver metal layers). Typical parameters, such as, for example, the type of NIR lamps used, peak wavelength, the sintering area, the maximum electrical power density of the system, the sintering time, the distance between the printhead and the NIR heater, and the gap between the NIR heater and the substrate, can be adjusted as needed to achieve sufficient drying of the inkjet ink and sintering/coalescence of the metal nanoparticles (A), according to the specifications of the particular NIR heater used.

NIR heaters which are generally suitable for usage in the methods herein have a peak wavelength of at least 800 nm, preferably at least 850 nm, more preferably at least 900 nm, even more preferably at least 950 nm, yet even more preferably at least 1,000 nm, and up to 1,200 nm, preferably up to 1,150 nm, more preferably up to 1,100 nm, even more preferably up to 1,050 nm. Silver nanoparticles, in particular, can be rapidly sintered at this NIR wavelength, at least in part due to the low specific heat capacity of metallic silver ($C_p$ of 0.233 J/g° C.). Thus, the metal nanoparticles (A), e.g., silver nanoparticles, can be efficiently sintered to form a metallic film of excellent quality/legibility when the inkjet ink is heated with the near infrared heater for 10 seconds or less, preferably 9 seconds or less, preferably 8 seconds or less, preferably 7 seconds or less, preferably 6 seconds or less, preferably 5 seconds or less, preferably 4 seconds or less, more preferably 3 seconds or less, even more preferably 2 seconds or less, yet even more preferably 1 second or less. Such speeds make the disclosed methods amenable to high throughput, line-run manufacturing.

In one non-limiting example, the substrate may be conveyed under an inkjet ink printhead which applies the inkjet ink of the present disclosure. The substrate containing the inkjet ink in the desired printing pattern may then be conveyed in-line under a heater (e.g., NIR heater) to sinter the metal nanoparticles (A), thereby converting the inkjet ink into a metallic film forming the metallic printed image. The distance of travel between the printhead and the heater is preferably from at least 30 cm, preferably at least 35 cm, more preferably at least 40 cm, even more preferably at least 45 cm, yet even more preferably at least 50 cm, and up to 100 cm, preferably up to 90 cm, more preferably up to 80 cm, even more preferably up to 70 cm, yet even more preferably up to 60 cm. The gap between the heater and the substrate may range from at least 0.5 cm, preferably at least 1 cm, preferably at least 1.5 cm, more preferably at least 2 cm, and up to 15 cm, preferably up to 10 cm, more preferably up to 5 cm, even more preferably up to 4 cm. The speed at which the substrate is conveyed under the heater may range from at least 5 feet/min, preferably at least 15 feet/min, preferably at least 30 feet/min, more preferably at least 50 feet/min, even more preferably at least 100 feet/min, yet even more preferably at least 150 feet/min, and up to 300 feet/min, preferably up to 250 feet/min, more preferably up to 200 feet/min, even more preferably up to 175 feet/min. It should be understood that the above NIR/drying parameters are merely exemplary, and such parameters can be adjusted outside of the above ranges as appropriate.

Once the applied ink is deemed dry, further coatings of inkjet ink may be applied, or any processing steps known to those of ordinary skill in the art may be performed as desired.

It should also be recognized that substrate surface treatments such as corona treatment, atmospheric plasma treatment, and flame treatment may optionally be employed in the methods herein prior to application of the inkjet inks to improve printed article characteristics, for example ink adhesion. The parameters of such substrate surface treatments may be varied greatly depending on the substrate material to be printed, the specific inkjet ink utilized, the printing method applied, and the desired properties and applications of the printed article.

The examples below are intended to further illustrate the inkjet inks and are not intended to limit the scope of the claims.

Examples

Materials

PROXEL GXL (preservative) is 20 wt. % solution of 1,2-benzisothiazolin-3-one in aqueous dipropylene glycol, available from Lonza.

COBRATEC TT50S (corrosion inhibitor) is a 50 wt. % aqueous solution of sodium tolyltriazole, available from PMC Specialties Group, Inc.

SAgN116 is a dispersion of metallic silver nanoparticles (about 50% by weight) and a styrene/polyethylene glycol monomethyl ether acrylate (n=9)/acrylic acid co-polymer (dispersant, about 3.3% by weight) in propylene glycol. The average particle size of the silver nanoparticles was determined to be 40 nm, as measured by the cumulant average particle size method described below. SAgN116 was prepared as follows:

<Preparation of dispersant> 1,4-dioxane (100.0 g) was added into a 1,000 mL flask equipped with a thermometer and a reflux device, and was heated until 80° C., then treated by nitrogen gas for 10 min. Styrene monomer (60.0 g), polyethylene glycol monomethyl ether acrylate (n=9)(37.0 g), acrylic acid (3.0 g), and 3-mercaptopropionic acid (1.5 g) as chain transfer agent were added into a beaker and mixed for 10 min as mixture-A. Next, 1,4-Dioxane (20.0 g) and 2,2'-azobis(2,4-dimethylvaleronitrile) (0.20 g) were mixed in a beaker as mixture-B. The mixtures-A and B were separately dropped into the flask containing 1,4-dioxane via dripping funnels over 90 min. After the dropwise additions were complete, the temperature of the flask was increased until 90° C. was achieved, and the reaction was mixed for 1 hour. The reaction was then cooled down to room temperature (about 23° C.), and volatile liquids were removed by a rotary evaporator, to obtain the styrene/polyethylene glycol monomethyl ether acrylate (n=9)/acrylic acid co-polymer (dispersant).

<Preparation of SAgN116> Silver (I) oxide (10.0 g), dispersant from above (0.8 g), and propylene glycol (9.2 g) were added into a 100 mL flask and mixed by magnetic stirrer for 30 min. The temperature of mixture was controlled by water bath to keep at 40° C. for 1 hour. A brownish silver nanoparticle dispersion was obtained, and was used as-is.

<Measurement of Cumulant Average Particle Size of silver nanoparticles> A sample to be measured was subjected to cumulant analysis using a laser particle analyzing system "ELS-8000" available from Otsuka Electrics Co., Ltd., to measure a cumulant average particle size of the silver nanoparticles. The measurement was conducted under the conditions including a temperature of 25° C., an angle between incident light and detector of 900 and a cumulative number of 100 times, and a refractive index of water (1.333) was input to the analyzing system as a refractive index of the dispersing medium. The concentration of the sample to be measured was controlled to $5 \times 10^{-3}$% in terms of a solid content thereof.

Inkjet Ink Evaluation Methods

Inkjet ink examples were evaluated through a HP45SI cartridge made by Hewlett Packard (thermal printing technology related to Hewlett Packard was used to evaluate the inks, software and hardware made by Inc.jet, Transport table made by Kirk Rudy) using the following printing conditions:

Voltage; 10.2 V

Pulse width; 2.2 µs

Pulse warming; 40° C.

Printing speed; 150 feet/minute

Condition; 25° C., 30% humidity.

After application of the inkjet inks onto the substrate, the substrate containing the inkjet ink in the requisite printing pattern was conveyed about 50 cm in-line to a NIR heater (model: NIR120M3 made by Adphos), and the inkjet inks were dried under the following drying parameters:

Power; 75%

Gap between the NIR heater and the substrate; 2 cm

Conveyer speed; 150 feet/minute.

Decap Time Evaluation

For evaluating decap times, the printing conditions utilized were as follows:

Printing substrate; non-coated paper (plain paper)

Printing resolution; 300 dpi*300 dpi (vertical*horizontal)

Figure 1A:
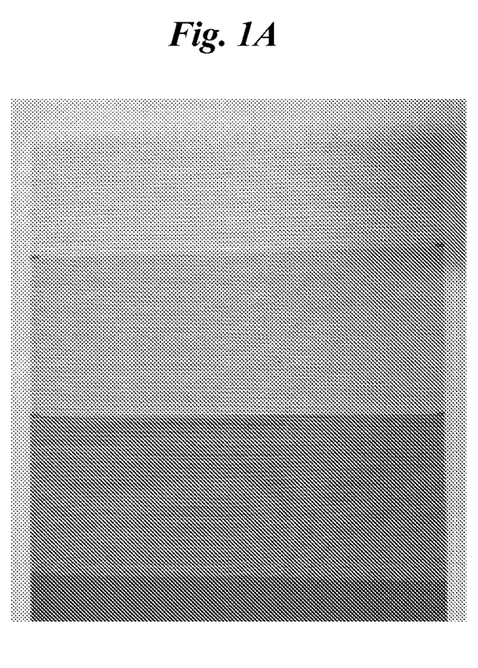
FIGS. 1A-1B illustrate a decap time evaluation using a Raster Line Test image, with FIG. 1A illustrating the results from an inkjet ink after a 10 minute decap (open) time with an "Acceptable" rating (1-4 rasters lost), and FIG. 1B illustrating the results from an inkjet ink after a 10 minute decap (open) time with a "Not Good" rating (5 or more rasters lost).
Figure 1B:
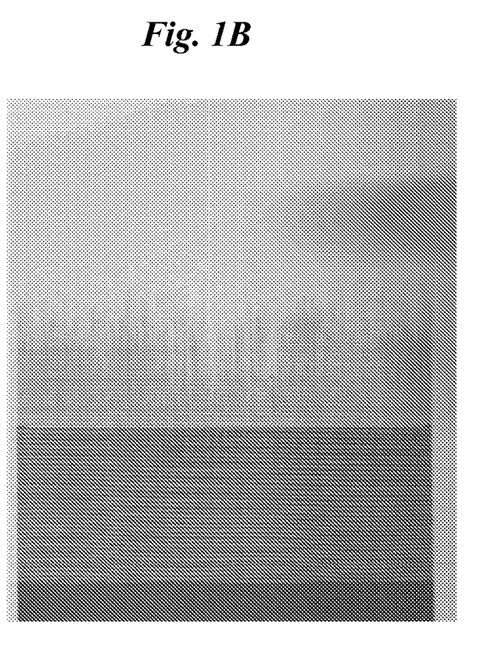

Printing image; 100% duty (Raster Line Test)(see e.g., FIGS. 1A and 1).

The Raster Line Test image was printed to confirm that there were no missing or unclear lines included in the metallic printed image (signifying plugged or missing nozzles). After confirming, the printhead was left decapped for a specific time (1, 5, 10, or 30 minutes), then reprinted using the same Raster Line Test image. The reprinted image (after the specific time lapse) was checked to determine whether any rasters were lost. If no loss of rasters occured at the tested time interval, then the inkjet inks were given a "G" (Good) decap rating for that time interval. If 1-4 rasters were lost at the tested time interval, then the inkjet inks were given an "A" (Acceptable) decap rating for that time interval. If 5 or more rasters were lost at the tested time interval, then the inkjet inks were given an "NG" (Not Good) decap rating for that time interval. Suitable/desirable inkjet inks were those which maintain a "G" or an "A" decap classification when decapped (i.e., exposed to air) for each of the tested time intervals.

Running Stability Evaluation

For evaluating the running stability of the inkjet inks during printing operations (the ability to remain dispersed/suspended without settling/sedimentation), the printing conditions utilized were as follows:

Printing substrate; non-coated paper (plain paper)

Printing resolution; 300 dpi*300 dpi (vertical*horizontal)

Printing image; 100% duty (1 mm*1 cm, Monochrome bitmap, narrow line image).

The narrow line image was printed uninterrupted for 500 consecutive prints, and the print quality of the 500$^{th}$ print was determined through visual inspection methods by checking for any missing nozzles. If no loss of lines/loss of line clarity occurred, then the inkjet ink was given a "G" (Good) running stability rating. If 1-2 lines were lost/lost clarity, but not enough to significantly affect the clarity or readability of the narrow line image, then the inkjet ink was given an "A" (Acceptable) running stability rating. If more than 2 lines were lost/lost clarity, then the inkjet ink was given an "NG" (Not Good) running stability rating. Suitable/desirable inkjet inks are those which maintain a "G" or an "A" running stability rating for the 500$^{th}$ print.

Finish Evaluation

For evaluating glossiness (metallic luster) of the metallic printed image, the printing conditions utilized were as follows:

printing substrate; Form 2C Opacity Chart, a black and white sealed opacity chart with overall dimensions of 7-5/8×10-1/4 in (194×260 mm), available from Leneta Company, Inc.

Printing resolution; 300 dpi*300 dpi (vertical*horizontal)

Printing image; 100% duty (1 cm*10 cm, Monochrome bitmap, solid block image).

The solid block image was printed on the black portion of the Form 2C Opacity Chart printing substrate according to the conditions above. The metallic printed image was then visually inspected for light-reflective qualities, with images having a mirror-like finish being rated as "glossy," and images with a hazy, dull, or non-reflective finish being rated as "not glossy." Desirable inkjet inks were those that provided a glossy finish.

Drying Properties Evaluation

For evaluating dry times, the printing conditions utilized were as follows:

Non-penetration printing substrate; a white PET film (U292W made by TEIJIN).

Printing resolution; 300 dpi*300 dpi (vertical*horizontal)

Printing image; 100% duty (1 cm*10 cm, Monochrome bitmap, solid block image).

The solid block image was printed according to the conditions above, and subjected to one or more passes under the near infrared (NIR) heater using the drying parameters described above. After each pass under the NIR heater, an abrasion test by finger was performed to test if color transfers from the metallic printed image to the finger. If color transfer occurred, then the metallic printed image was subjected to an additional pass under the NTR heater and the abrasion test repeated. This process was repeated until no color transfer occurred (i.e., the inkjet ink was completely dried). Inkjet inks which were dried (no color transfer) after a single (1) pass under the NTR heater were rated "G" (Good); Inkjet inks which were dried (no color transfer) after two (2) passes under the NIR heater were rated "A" (Acceptable); Inkjet inks which were dried (no color transfer) after three (3) or more passes under the NIR heater were rated "NG" (No Good) in terms of drying properties. Desirable inkjet inks were those which received a "G" or "A" drying property rating.

Inkjet Ink Examples

Example inkjet inks are given in Table 1. The amount of each component is expressed in terms of weight percentage relative to a total weight (100%) of the inkjet ink. * denotes the example is a comparative example.

Preparation Methods

To prepare the example inkjet inks, the listed amounts of DI water, PROXEL GXL, COBRATEC TT50S, and isopropanolamine were mixed by mechanical stirrer. Then the appropriate combination of trimethylene glycol (TMG), glycerol, propylene glycol, ethylene glycol, and/or 1,2-hexanediol were added in the amounts listed with further mixing. The SAgN116 (silver nanoparticle dispersion) was then added and mixing was continued to obtain the inkjet inks. The inkjet ink examples were then evaluated through the HP45SI cartridge made by Hewlett Packard.

TABLE 1

Inkjet Ink Examples 1-10

| Ingredient | | Ex 1 | Ex 2 | Ex 3 | Ex 4 | Ex 5 | Ex 6* | Ex 7 | Ex 8 | Ex 9* | Ex 10 |
|---|---|---|---|---|---|---|---|---|---|---|---|
| DI water | (D) | 42.20 | 34.45 | 34.45 | 42.20 | 34.45 | 34.45 | 24.45 | 44.70 | 45.70 | 38.70 |
| PROXEL GXL | (G) | 0.20 | 0.20 | 0.20 | 0.20 | 0.20 | 0.20 | 0.20 | 0.20 | 0.20 | 0.20 |
| COBRATEC TT50S | | 0.20 | 0.20 | 0.20 | 0.20 | 0.20 | 0.20 | 0.20 | 0.20 | 0.20 | 0.20 |
| Isopropanolamine | (F) | 1.15 | 1.15 | 1.15 | 1.15 | 1.15 | 1.15 | 1.15 | 1.15 | 1.15 | 1.15 |
| Trimethylene glycol | (B) | 17.25 | 17.25 | 17.25 | 1.00 | 25.00 | — | 35.00 | 17.25 | 17.25 | 17.25 |
| Glycerol | | — | — | — | — | — | 25.00 | — | — | — | — |
| Propylene glycol | (E) | — | 7.75 | — | — | — | — | — | — | — | — |
| Ethylene glycol | | — | — | 7.75 | 16.25 | — | — | — | — | — | — |
| 1,2-hexanediol | (C) | 3.50 | 3.50 | 3.50 | 3.50 | 3.50 | 3.50 | 3.50 | 1.00 | — | 7.00 |
| SAgN116 | (A) | 35.50 | 35.50 | 35.50 | 35.50 | 35.50 | 35.50 | 35.50 | 35.50 | 35.50 | 35.50 |
| (wt. % active) | | (17.75) | (17.75) | (17.75) | (17.75) | (17.75) | (17.75) | (17.75) | (17.75) | (17.75) | (17.75) |
| Total | | 100.0 | 100.0 | 100.0 | 100.0 | 100.0 | 100.0 | 100.0 | 100.0 | 100.0 | 100.0 |

Inkjet Ink Performance

As shown in Table 2, inkjet inks formulated with metal nanoparticles, trimethylene glycol, and 1,2-hexanediol were found to possess excellent decap behavior, running stability, and produced metallic printed images with excellent surface finish (e.g., high gloss) (Examples 1-5, 7-8, and 10).

Conversely, inkjet inks in which the trimethylene glycol was replaced with glycerol were found to suffer from unacceptable running stability, decap performance, and drying properties (Example 6). Additionally, removal of trimethylene glycol was also found to degrade the surface finish, with Example 6 providing metallic printed images categorized as hazy, dull, or non-reflective.

Likewise, removal of 1,2-hexanediol provided poorly performing inkjet inks in terms of decap behavior and surface finish, with significant reticulation occurring in the printed image (Example 9).

In terms of the amount of trimethylene glycol, even low quantities (1 wt. %) were found to be sufficient for providing suitable inkjet inks with acceptable decap performance (Example 4). Increasing the trimethylene glycol quantity to 25 wt. % also provided desirable inkjet inks (Example 5). However, further increases to the amount of trimethylene glycol to 35 wt. % led to diminished drying properties, which may still be satisfactory for certain applications (Example 7).

Regarding the amount of 1,2-hexanediol, suitable inkjet inks were obtained at all amounts of 1,2-hexanediol tested when used in combination with trimethylene glycol (Examples 1-5, 7-8, and 10).

Further, the use of additional glycol co-solvent such as propylene glycol (Example 2) or ethylene glycol (Example 3) improved inkjet ink performance, e.g., in terms of decap behavior, compared to comparable inks (Example 1).

TABLE 2

Performance of Inkjet Ink Examples 1-10

| | | Ex 1 | Ex 2 | Ex 3 | Ex 4 | Ex 5 | Ex 6* | Ex 7 | Ex 8 | Ex 9* | Ex 10 |
|---|---|---|---|---|---|---|---|---|---|---|---|
| Running stability (500 prints) | | G | G | G | G | G | NG | A | G | G | A |
| Decap (open) time (min) | 1 | G | G | G | G | G | NG | G | G | G | G |
| | 5 | G | G | G | G | G | NG | G | A | A | G |
| | 10 | G | G | G | A | G | NG | G | A | A | A |
| | 30 | A | G | G | A | G | NG | G | A | NG | A |
| Drying Properties | | G | A | G | G | A | NG | NG | G | G | G |
| Finish | | Glossy | Glossy | Glossy | Glossy | Glossy | Not glossy | Glossy | Glossy | N/A[a] | Glossy |

[a] Inkjet ink resulted in reticulation

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An inkjet ink, comprising:
(A) metal nanoparticles;
(B) trimethylene glycol; and
(C) 1,2-hexanediol, wherein
a weight ratio of trimethylene glycol (B) to 1,2-hexanediol (C), (B):(C), is from 2:1 to 20:1.

2. The inkjet ink of claim 1, wherein the metal nanoparticles (A) are present in an amount of 1 to 25 wt. %, based on a total weight of the inkjet ink.

3. The inkjet ink of claim 1, wherein the metal nanoparticles (A) have an average particle size of less than 100 nm.

4. The inkjet ink of claim 1, wherein the metal nanoparticles (A) are silver nanoparticles.

5. The inkjet ink of claim 1, wherein the trimethylene glycol (B) is present in an amount of 0.5 to 30 wt. %, based on a total weight of the inkjet ink.

6. The inkjet ink of claim 1, wherein the 1,2-hexanediol (C) is present in an amount of 0.1 to 15 wt. %, based on a total weight of the inkjet ink.

7. The inkjet ink of claim 1, further comprising (D) water.

8. The inkjet ink of claim 7, wherein the water (D) is present in an amount of 15 to 60 wt. %, based on a total weight of the inkjet ink.

9. The inkjet ink of claim 7, wherein a weight ratio of water (D) to a sum of trimethylene glycol (B) and 1,2-hexanediol (C), (D):((B)+(C)), is from 0.5:1 to 15:1.

10. The inkjet ink of claim 1, further comprising (E) a glycol co-solvent.

11. The inkjet ink of claim 10, wherein the glycol co-solvent (E) is present in an amount of 1 to 40 wt. %, based on a total weight of the inkjet ink.

12. The inkjet ink of claim 10, wherein the glycol co-solvent (E) is ethylene glycol, propylene glycol, or both.

13. The inkjet ink of claim 1, further comprising (F) an alkanolamine.

14. The inkjet ink of claim 13, wherein the alkanolamine (F) is present in an amount of 0.1 to 10 wt. %, based on a total weight of the inkjet ink.

15. The inkjet ink of claim 13, wherein the alkanolamine (F) is at least one selected from the group consisting of ethanolamine, propanolamine, isopropanolamine, diethanolamine, and triethanolamine.

16. A printed article, comprising:
a substrate; and
a metallic film, formed from the inkjet ink of claim 1, disposed on a surface of the substrate.

17. The inkjet ink of claim 1, wherein a total amount of the trimethylene glycol (B) and 1,2-hexanediol (C), ((B)+(C)) is 20.75 to 28.50 wt. %, based on a total weight of inkjet ink.

18. A method of forming a metallic printed image on a substrate, comprising:
applying the inkjet ink of claim 1 onto the substrate with a thermal inkjet printhead; and
drying the inkjet ink, thereby converting the inkjet ink into a metallic film forming the metallic printed image.

19. The method of claim 18, wherein the inkjet ink is dried with a near infrared heater to sinter the metal nanoparticles (A), thereby converting the inkjet ink into the metallic film.

* * * * *